United States Patent
Kwon et al.

(10) Patent No.: US 7,107,071 B1
(45) Date of Patent: Sep. 12, 2006

(54) INTEGRATION OF FIXED WIRELESS TERMINAL WITH BROADCAST RADIO RECEIVING DEVICES

(75) Inventors: Mike Kwon, San Diego, CA (US); David Kim, San Diego, CA (US); Sidney Park, San Diego, CA (US); Simon Yi, San Diego, CA (US)

(73) Assignee: Axesstel, Inc., San Diego, CA (US)

( * ) Notice: Subject to any disclaimer, the term of this patent is extended or adjusted under 35 U.S.C. 154(b) by 0 days.

(21) Appl. No.: 11/180,104

(22) Filed: Jul. 12, 2005

Related U.S. Application Data

(60) Provisional application No. 60/658,996, filed on Mar. 4, 2005.

(51) Int. Cl.
*H04M 1/00* (2006.01)

(52) U.S. Cl. .............................. 455/556.1; 455/550.1; 455/557; 455/569.2

(58) Field of Classification Search ............. 455/556.1, 455/557, 566, 575.1, 3.02, 3.06, 550.1, 569.2
See application file for complete search history.

(56) References Cited

U.S. PATENT DOCUMENTS

| | | | |
|---|---|---|---|
| 5,929,774 | A | 7/1999 | Charlton |
| 6,681,120 | B1 | 1/2004 | Kim |
| 2002/0142759 | A1 | 10/2002 | Newell et al. |
| 2004/0132468 | A1 | 7/2004 | Rogalski et al. |
| 2005/0151871 | A1 | 7/2005 | Minami |

*Primary Examiner*—Quochien B. Vuong
*Assistant Examiner*—Christian A. Hannon
(74) *Attorney, Agent, or Firm*—Procopio, Cory, Hargreaves & Savitch LLP; Samuel S. Lee

(57) ABSTRACT

A system comprising: a broadcast radio receiving device configured to receive and provide broadcast audio-visual signals; and a fixed wireless terminal apparatus coupled to the broadcast radio receiving device, wherein the fixed wireless terminal apparatus manages and controls characteristics of the broadcast audio-visual signals.

4 Claims, 5 Drawing Sheets

INTEGRATION OF FIXED WIRELESS TERMINAL WITH BROADCAST RADIO RECEIVING DEVICES

CROSS-REFERENCE TO RELATED APPLICATIONS

This application claims the benefit of priority of co-pending U.S. Provisional Patent Application Ser. No. 60/658,996 entitled "Integration of Fixed Wireless Terminal with Broadcast Radio Receiving Devices", filed Mar. 4, 2005. Benefit of priority of the filing date of Mar. 4, 2005 is hereby claimed, and the disclosure of the Provisional Patent Application is hereby incorporated by reference.

BACKGROUND

In telecommunications, the final drop from the local telephone exchange to a subscriber's terminal or private exchange is known as the "local loop". Conventionally, this final drop includes a network of copper-pair lines, which are expensive to install and to maintain. In sparsely populated areas with low telephone penetration, this approach is impracticable. Wireless Local Loop (WLL) is a recent alternative to the copper-line network.

In WLL, a wireless system makes up all or part of the transmission path between the subscriber and the local exchange, and typically uses microwave, cordless or cellular technologies. Thus, the wireless system in WLL is particularly suitable for reducing the cost of the local loop in remote or rural areas. However, in contrast to mobile telecommunications, fixed wireless terminals are fixed and do not act as mobile terminals.

Typically, such a fixed wireless terminal (or WLL terminal) includes a transceiver including an RF section for receiving and transmitting RF signals and a baseband section for converting between RF and baseband signals for interfacing with a subscriber device; an interface for connecting the subscriber device to the fixed wireless terminal; a subscriber line interface circuit for providing network dependent characteristics such as the tones (e.g., ringing, dial, busy signal, etc.) which, in a fixed network, are conventionally provided by the local exchange; an external power supply; and an antenna. The subscriber device typically includes a telephone and/or a fax machine.

A broadcast radio receiving device, such as an AM/FM/TV radio or television set, typically includes an antenna and a receiver for receiving an AM/FM/TV or television signal. However, conventional broadcast radio receiving devices are configured to be manually tuned to receive the signal and manually adjusted to vary audio and/or video levels.

SUMMARY

Embodiments of the present invention provide systems, apparatuses, and methods for integrating the fixed wireless terminal with broadcast radio receiving devices so that characteristics of the broadcast audio/video/text signals generated by an AM/FM/TV broadcast receiver can be controlled by the fixed wireless terminal.

In one implementation, a system is disclosed. The system includes: a broadcast radio receiving device configured to receive and provide broadcast audio-visual signals; and a fixed wireless terminal apparatus coupled to the broadcast radio receiving device, wherein the fixed wireless terminal apparatus manages and controls characteristics of the broadcast audio-visual signals.

In another implementation, a fixed wireless terminal apparatus is disclosed. The apparatus includes: a broadcast radio receiving device configured to receive and provide broadcast audio-visual signals; and a fixed wireless terminal operating to manage and control characteristics of the broadcast audio-visual signals, wherein the broadcast radio receiving device is integrated into the fixed wireless terminal.

In another implementation, a method for integrating a fixed wireless terminal with a broadcast radio receiving device is disclosed. The method includes: configuring a broadcast radio receiving device to provide broadcast audio-visual signals; coupling a fixed wireless terminal to the broadcast radio receiving device; and managing and controlling characteristics of the broadcast audio-visual signals from the fixed wireless terminal.

DETAILED DESCRIPTION

Embodiments of the present invention provide systems, apparatuses, and methods for integrating the fixed wireless terminal with broadcast radio receiving devices so that characteristics of the broadcast audio/video/text signals generated by an AM/FM/TV broadcast receiver can be controlled by the fixed wireless terminal. The control signals are generated in response to the call status (e.g., muting the signal volume when a call comes in) of the fixed wireless terminal. Further, inputs for controlling the audio/video/text signals can be entered through the existing keypad on the fixed wireless terminal so that integration does not require any hardware modification of the fixed wireless terminal.

The term "fixed wireless terminal" as used in this disclosure refers to a telecommunication apparatus that provides telephone service, where all or part of the transmission path between the subscriber and the local exchange is wireless. Typically, the terminal provides telephone service connection so that the subscriber device, such as a standard telephone, can be connected to the terminal. However, in some implementations, the terminal can be configured so that the telephone is integrated into the terminal. Various implementations of the present invention are illustrated in FIG. 1 through FIG. 4.

Figure 1:
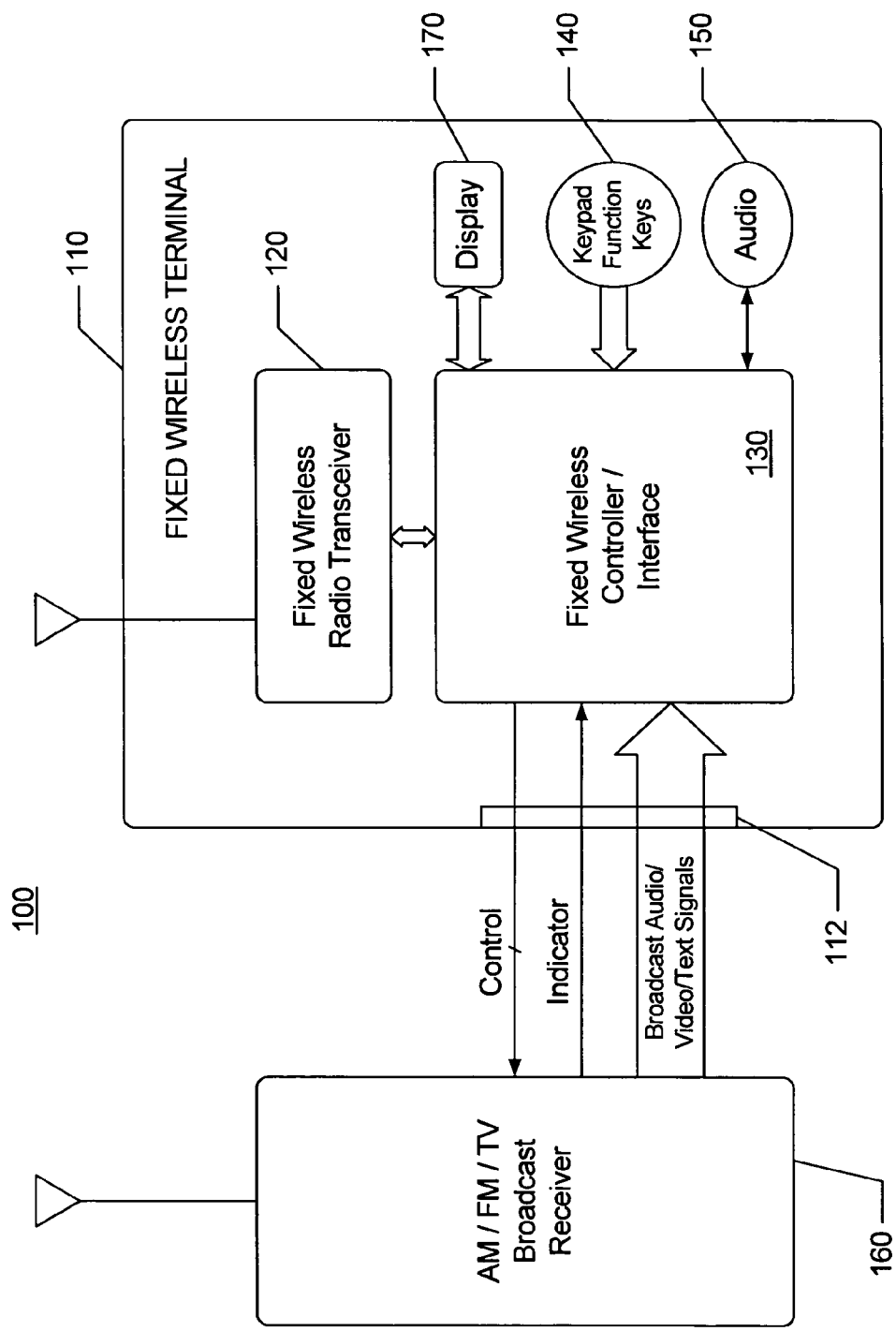
FIG. 1 illustrates a fixed wireless terminal system in which a fixed wireless terminal apparatus is coupled to a broadcast radio receiving device.

FIG. 1 illustrates a fixed wireless terminal system 100 in which a fixed wireless terminal apparatus 110 is coupled to a broadcast radio receiving device 160. In the illustrated example of FIG. 1, the broadcast radio receiving device 160 is configured as an AM/FM radio receiver coupled to the terminal 110. In this example, the broadcast audio and/or text signals are transmitted over AM and FM carriers. In another example, the broadcast audio and/or text signals are transmitted using a satellite. In yet another example, the broadcast audio and/or text signals are transmitted using a wide-area network such as the Internet.

In another example, the broadcast radio receiving device 160 is configured as a television set coupled to the terminal 110. In this example, the system 100 can be configured to display the video on a display 170, or configured to output only audio from the television set to an audio module 150.

In yet another example, the broadcast radio receiving device 160 is integrated into the fixed wireless terminal 110 as a single unit. In yet another example, the broadcast radio receiving device 160 receives text messages over radio carriers such as an AM or FM carrier. The text messages, sometimes referred to as tickers, can be displayed on a display 170.

In the illustrated example of FIG. 1, the fixed wireless terminal apparatus 110 includes a fixed wireless radio transceiver 120, a fixed wireless controller/interface module 130, a keypad 140, and an audio element 150. The keypad 140 includes numeric keys as well as function keys. The audio element 150 includes a speaker and a microphone. In other implementations, the keypad 140 includes other elements such as a joystick or a jog dial; and the audio element 150 includes other elements such as an earphone. In a further implementation, the fixed wireless terminal apparatus 110 includes other user interface elements such as a display.

The AM/FM/TV radio receiver 160 is configured to be coupled to the fixed wireless terminal 110 through a connector 112, which provides signal connection between the AM/FM/TV radio receiver 160 and the fixed wireless controller/interface module 130. Thus, the connection enables the controller/interface module 130 to control and manage different characteristics of the broadcast audio-visual signal from the AM/FM/TV radio receiver 160 using control signals. Further, the controller/interface 130 can adjust the characteristics of the broadcast audio-visual signal in response to an indication signal from the AM/FM/TV radio receiver 160.

In another implementation, as mentioned above, the AM/FM/TV radio receiver 160 can receive text messages (i.e., tickers) over radio carriers such as an FM carrier and can display the tickers on a display 170.

Figure 2:
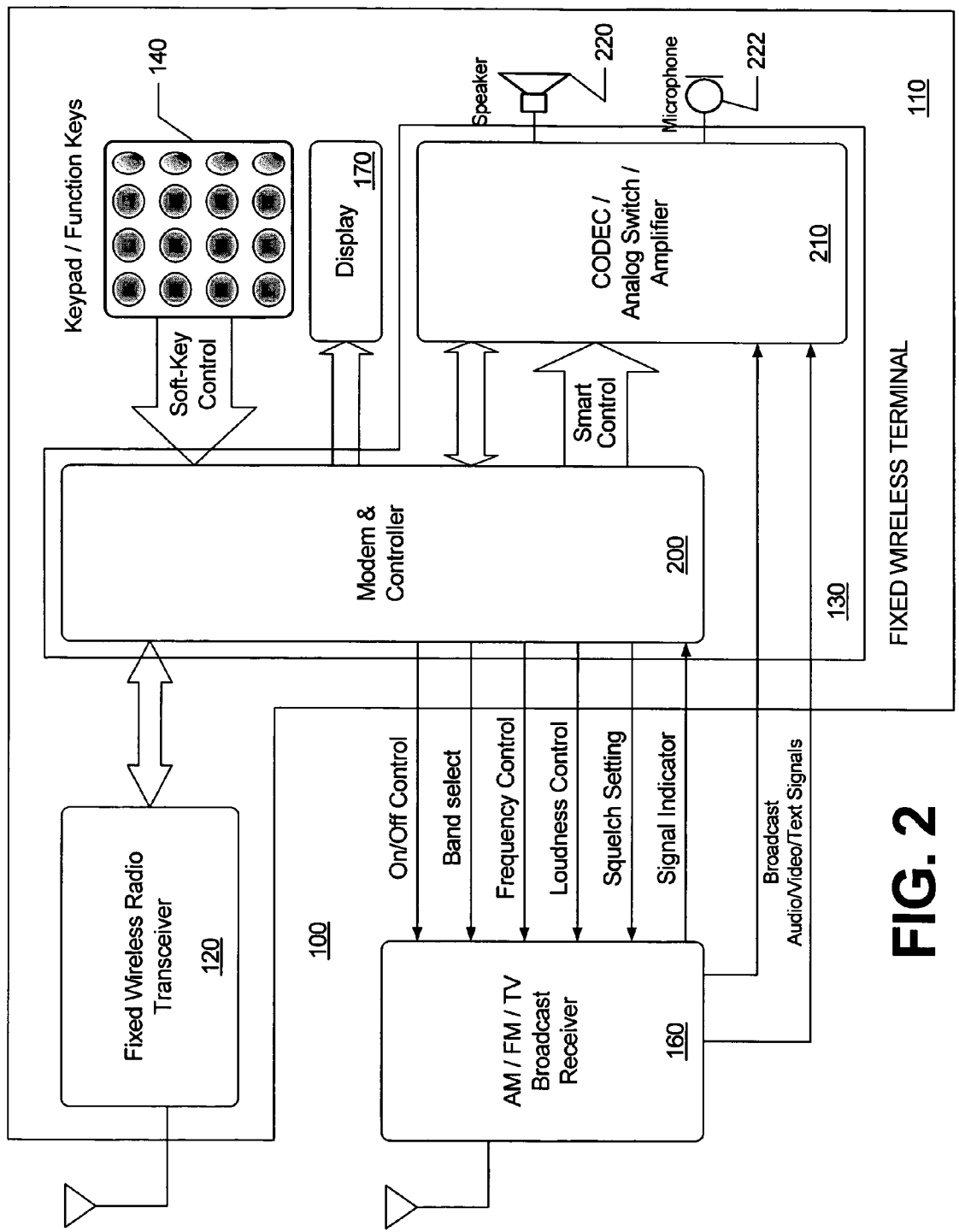
FIG. 2 illustrates a detailed block diagram of the fixed wireless terminal system showing details of the fixed wireless controller/interface module and the input/output signals between the AM/FM/TV radio receiver and the controller interface module.

FIG. 2 illustrates a detailed block diagram of the fixed wireless terminal system 100 showing details of the fixed wireless controller/interface module 130 and the input/output signals between the AM/FM/TV radio receiver 160 and the controller interface module 130. Input signals include control signals including an on/off control, a band or station select, a frequency control, a loudness control, and a squelch setting. Output signals include indicator signals.

In the illustrated example of FIG. 2, the controller/interface module 130 is represented as two modules: a modem and controller module 200 and a codec/analog switch/amplifier module 210.

Typically, the modem enables transmission of data over telephone lines. Furthermore, if the data to be transmitted is processed and stored in the telephone as digital data, then the modem operates to convert the digital data into analog form before transmitting the data over the telephone line. The codec (i.e., the coder/decoder) encodes or decodes a signal. For example, typical telephones use codecs to convert tones into analog signals. The analog switch is used to switch between modes, such as between an input mode using a microphone 222 to an output mode using a speaker 220.

The keypad 140 provides softkey control to program the controller 200. The softkey control allows keys on the keypad 140 to change function depending on the current task of the terminal 110. Thus, in one example, the keypad 140 is used to program the controller 200 so that the AM/FM/TV radio receiver 160 is turned on at a programmed time. The use of the keypad 140 on the fixed wireless terminal 110 allows control and integration of the AM/FM/TV radio receiver 160 with the fixed wireless terminal 110 without any substantial hardware design change. Only firmware of the fixed wireless terminal 110 needs to be modified.

Although the illustrated implementation of FIG. 2 shows the keypad 140, the display 170, the speaker 220, and the microphone 222 as being part of the fixed wireless terminal 110, the modules 140, 170, 220, 222 can be shared with the AM/FM/TV broadcast receiver 160. For example, the keypad 140 can be used to tune the receiver 160 to a desired station; the display 170 can be used to display the video portion of the receiver 160; the speaker 220 can be used to output the audio portion of the receiver 160; and the microphone 222 can be used to input voice signal into the receiver 160.

In another example, the controller 200 is programmed to control the volume from the AM/FM/TV radio receiver 160. Therefore, controlling and managing different characteristics of the broadcast audio/video/text signal involves programming the modem/controller module 200 using the keypad 140 so that the module 200 generates "smart" control signals. These "smart" control signals are derived from control parameters that direct the codec/analog switch/amplifier module 210 to control and adjust the characteristics of the broadcast audio/video/text signal received at the codec/analog switch/amplifier module 210. The module 210 then receives or transmits the result to the elements, such as a speaker 220, a microphone 222, and a display 170, and controls the characteristics of the received or transmitted audio/video/text signals. For example, a control parameter directs the codec/analog switch/amplifier module 210 to decrease the volume level of the audio signal when an incoming call is detected.

Figure 3:
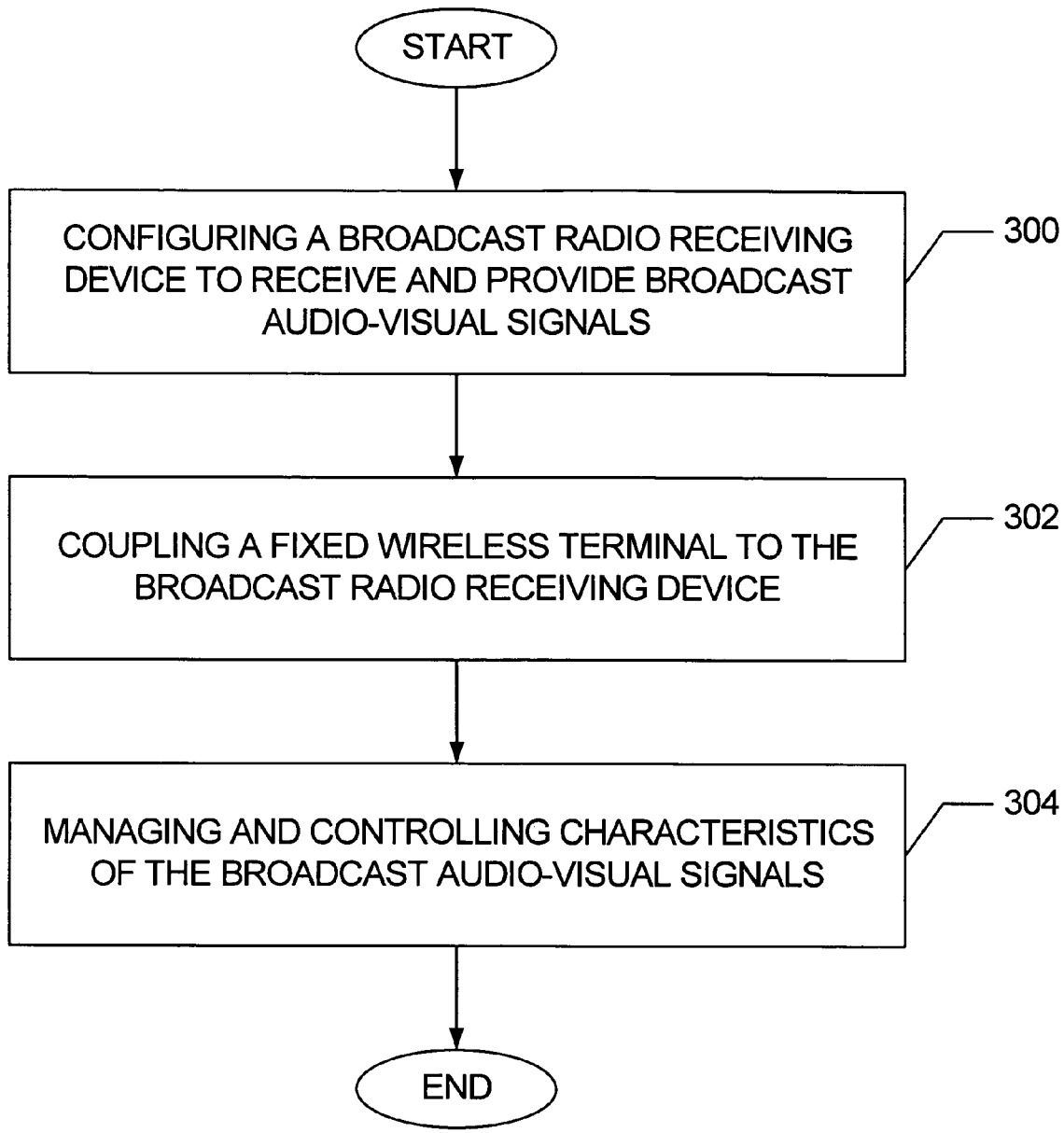
FIG. 3 shows a method for controlling and managing characteristics of the broadcast audio/video/text signals generated by an AM/FM/TV broadcast receiver.

FIG. 3 shows a method for integrating a fixed wireless terminal with a broadcast radio receiving device. The method includes configuring the broadcast radio receiving device to provide broadcast audio-visual signals, at 300. The fixed wireless terminal is coupled to the broadcast radio receiving device, at 302. Then, at 304, characteristics of the broadcast audio-visual signals are managed and controlled.

Figure 4A:
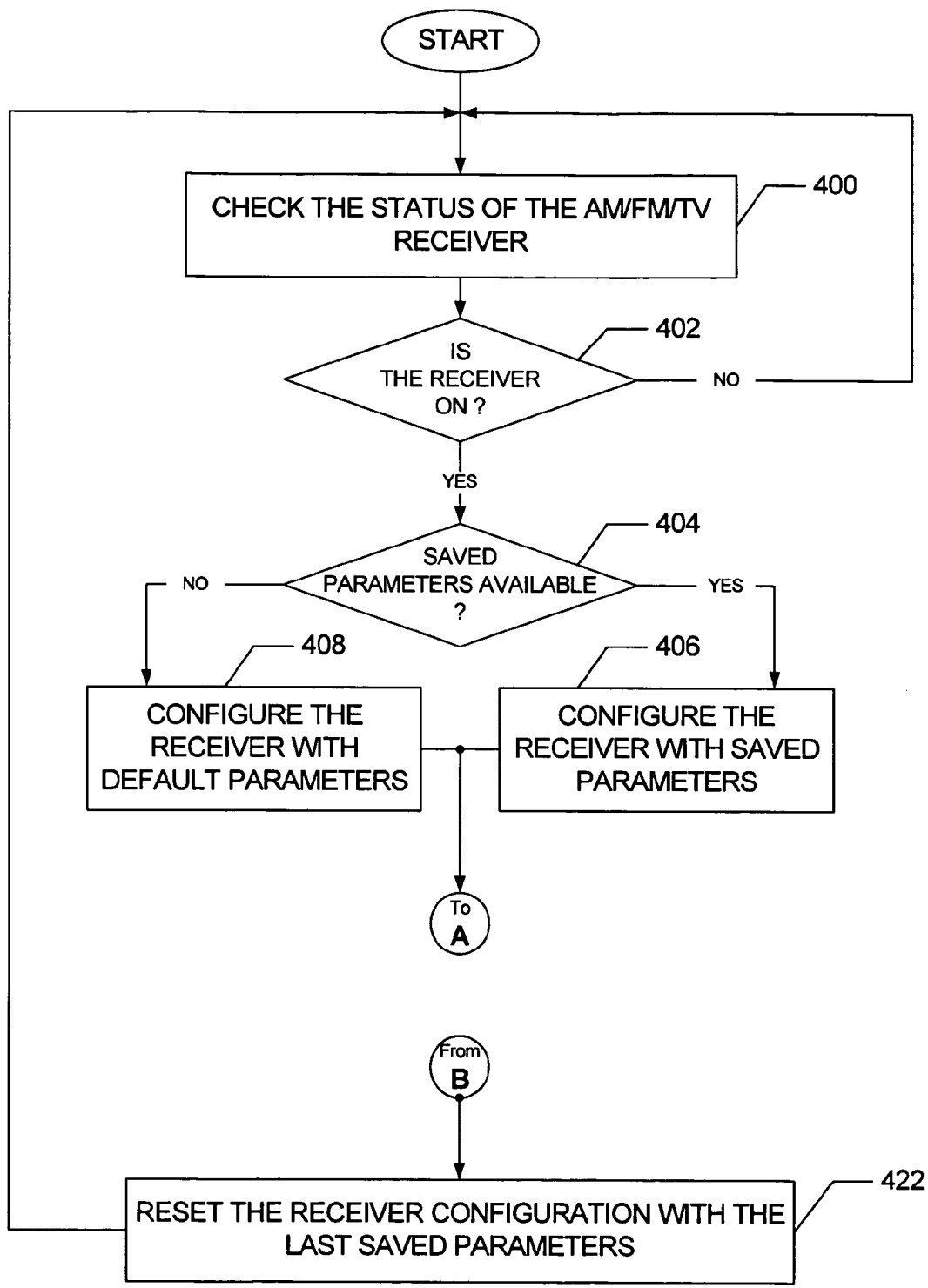
FIGS. 4A and 4B show a method for controlling and managing characteristics of the broadcast audio/video/text signals generated by an AM/FM/TV broadcast receiver.
Figure 4B:
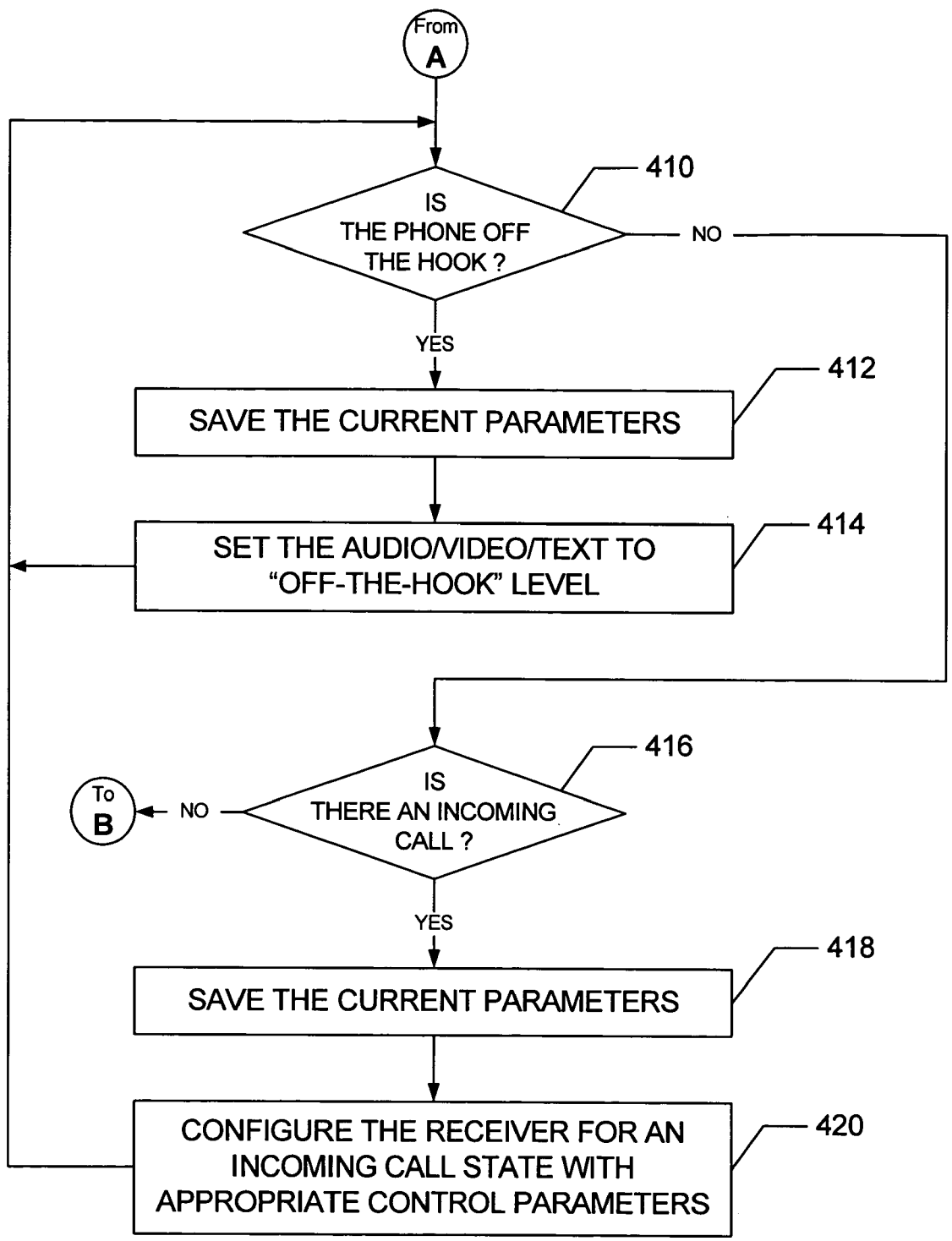

FIGS. 4A and 4B show a method for controlling and managing characteristics of the broadcast audio/video/text signals generated by an AM/FM/TV broadcast receiver 160. Initially, the status of the AM/FM/TV receiver 160 is determined at 400. If it is determined, at 402, that the receiver 160 is on, then a determination is made, at 404, whether saved control parameters are available. If the saved control parameters are available, then the receiver 160 is configured with the saved control parameters, at 406. Otherwise if the saved control parameters are not available, then the receiver 160 is configured with the default parameters, at 408.

Further, a determination is made, at 410, whether the handset of the terminal 110 is off the hook. If the handset is off the hook, then the current parameters of the receiver 160 are saved, at 412, and the audio/video/text of the receiver is set to the "off-the-hook" level, at 414. For example, if the handset is off the hook, the volume of the receiver 160 is set to the "off-the-hook" level of "low". Otherwise, if the handset is not off the hook, a check is made, at 416, to determine if there is an incoming call. If there is an incoming call, then the current parameters of the receiver 160 are saved as last saved parameters, at 418, and the receiver 160 is configured for an incoming call state with appropriate control parameters, at 420. Otherwise, if there is no incoming call, then the receiver 160 is reset with the last saved parameters, at 422.

An example of a "smart" control signal derived from the control parameter includes a control signal that controls the broadcast audio signal so that the audio signal turns off during a phone conversation. Another example of a "smart" control signal includes a control signal that controls the broadcast audio signal so that the audio signal turns off automatically when there is an incoming call, an outgoing call, and/or when the handset is off the hook.

Another example of a "smart" control signal includes a control signal that controls the broadcast audio signal so that the volume of the audio signal is reduced or turned off when the phone conversation is on hold, a three-way calling is being set up, or a call is being forwarded. Another example of a "smart" control signal includes a control signal that controls the broadcast audio signal so that the audio signal is inserted into the transmit-audio pass of the fixed wireless terminal automatically or manually during an on-hold mode, when a three-way calling is being set up, or when a call transfer is being made. Another example of a "smart" control signal includes a control signal that controls the broadcast audio signal so that the audio signal is used as a ring tone automatically or manually. Another example of a "smart" control signal includes a control signal that controls the broadcast audio signal so that the audio signal is used as a ringer sound or other alert sound according to the user's set up. Another example of a "smart" control signal includes a control signal that controls the broadcast audio signal so that the audio signal is turned on automatically to generate alert sound per timer setup programmed by the user. Another example of a "smart" control signal includes a control signal that controls the broadcast audio signal so that the audio signal is turned on automatically to provide special music or sound (e.g., a religious music) at a programmed time.

Other examples of "smart" control signals include a control signal that controls the broadcast video signal so that the displayed video signal is silhouetted when an incoming call, an outgoing call, and/or a handset-off-the-hook signal is detected, and caller identification information is to be displayed on top of the displayed video signal.

Various implementations of the invention are realized in electronic hardware, computer software, or combinations of these technologies. Most implementations include one or more computer programs executed by a programmable computer. For example, in one implementation, the method for controlling and managing characteristics of the broadcast audio/video/text signals generated by an AM/FM/TV broadcast receiver includes one or more computers executing software implementing the control and management processes. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. For example, while the above description describes several examples for controlling and managing characteristics of the broadcast audio signal, characteristics of other broadcast signals such as video and text signals can be controlled and managed by the controller in the fixed wireless terminal.

Accordingly, the present invention is not limited to only those implementations described above.

What is claimed is:

1. A method for integrating a fixed wireless terminal with a broadcast radio receiving device, the method comprising:
    configuring a broadcast radio receiving device to provide broadcast audio-visual signals;
    coupling a fixed wireless terminal to said broadcast radio receiving device;
    managing and controlling characteristics of said broadcast audio-visual signals from said fixed wireless terminal,
    wherein said managing and controlling includes determining whether said broadcast radio receiving device is turned on; and
    determining whether saved control parameters are available when said broadcast radio receiving device is turned on;
    wherein said saved control parameters include a control signal that controls said broadcast audio-visual signals so that an audio portion of said audio-visual signal turns off during a phone conversation.

2. A method for integrating a fixed wireless terminal with a broadcast radio receiving device, the method comprising:
    configuring a broadcast radio receiving device to provide broadcast audio-visual signals;
    coupling a fixed wireless terminal to said broadcast radio receiving device;
    managing and controlling characteristics of said broadcast audio-visual signals from said fixed wireless terminal,
    wherein said managing and controlling includes determining whether said broadcast radio receiving device is turned on;
    determining whether a handset of said fixed wireless terminal is off the hook;
    determining whether there is an incoming call on said fixed wireless terminal if said terminal is not off the hook;
    saving current parameters of said broadcast radio receiving device as last saved parameters; and
    configuring said broadcast radio receiving device for an incoming call state with appropriate control parameters if there is an incoming call on said fixed wireless terminal.

3. The method of claim 2, further comprising
    resetting said broadcast radio receiving device with said last saved parameters if there is no incoming call on said fixed wireless terminal.

4. A method for integrating a fixed wireless terminal with a broadcast radio receiving device, the method comprising:
    configuring a broadcast radio receiving device to provide broadcast audio-visual signals;
    coupling a fixed wireless terminal to said broadcast radio receiving device;
    managing and controlling characteristics of said broadcast audio-visual signals from said fixed wireless terminal,
    wherein said managing and controlling includes determining whether said broadcast radio receiving device is turned on;
    determining whether a handset of said fixed wireless terminal is off the hook;
    determining whether there is an incoming call on said fixed wireless terminal if said terminal is not off the hook;

saving current parameters of said broadcast radio receiving device as last saved parameters;
configuring said broadcast radio receiving device for an incoming call state with appropriate control parameters if there is an incoming call on said fixed wireless terminal; and resetting said broadcast radio receiving device with said last saved parameters if there is no incoming call on said fixed wireless terminal.

* * * * *